Patented July 12, 1927.

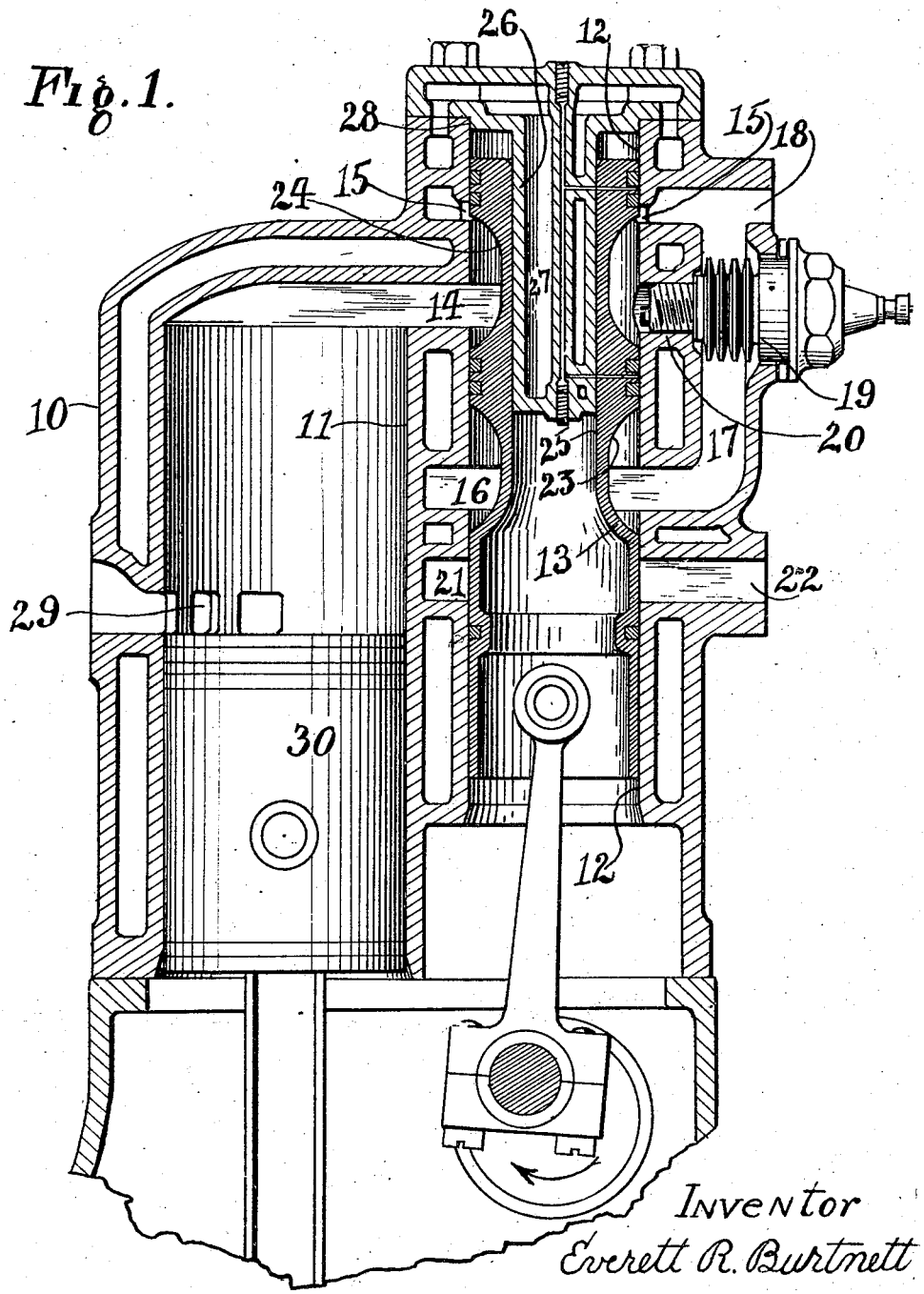

1,635,535

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION.

INTERNAL-COMBUSTION ENGINE.

Application filed May 15, 1926. Serial No. 109,243.

My invention relates generally to internal combustion engines and particularly to engines of the two stroke cycle type, the principal objects of my invention being to improve upon the valve structure, valve function, valve cooling and performance of two stroke cycle engines; to provide an engine of the character referred to, with a valvular structure consisting of one valve member, for each combustion cylinder, the single valve providing a double valve capacity, one inlet port registration and port cut-off between the source of fresh charge pumping induction and the combustion chamber, and inlet port registration and port cut-off between the source of fresh charge supply and the fresh charge pumping means.

A further object is to provide means of facilitating heat convection from the body of the valve, from the inside, a hollow depending plug being arranged as a stationary member, in which a cooling fluid may be circulated, the bore of the valve being moved in surface contact over the periphery of the cooling member.

With the foregoing and other objects in view, my invention consists in certain novel features of construction and arrangement of parts that will be hereinafter more fully described and claimed and illustrated in the accompanying drawings, in which:

Fig. 1 is a vertical cross section taken through a combustion cylinder and the valve structure of my improved internal combustion engine.

Referring by numerals to the accompanying drawings, which illustrate a practical embodiment of my invention, 10 designates a cylinder block, a combustion cylinder 11 is formed in the cylinder block.

A valve cylinder 12 is formed axially parallel with and to the side of the combustion cylinder. A fresh charge inlet valve 13 is arranged for reciprocatory movement within the said valve cylinder. A connecting passage 14, formed as a lateral extension of the chamber formed in the head end of the combustion cylinder intersects the valve cylinder. The valve cylinder extending headwardly and crankwardly from the point at which the communicating passage which joins the chamber of the valve cylinder to the chamber of the combustion cylinder intersects the valve cylinder.

A series of fresh charge transfer ports 15, are formed in the valve cylinder, at a point headward of the lateral extension of the combustion chamber. An annular opening 16 is formed in the wall of the valve cylinder, at a point crankward of the lateral extension of the combustion chamber, a communicating passage 17 is formed between the fresh charge transfer ports 15 and the said annular opening 16. An opening 18 is formed in the communicating passage 17, to which may be connected a passage with a means of charge pumping.

A spark plug 19 is secured in the wall of the valve cylinder, at a point coincident with the lateral extension of the combustion chamber, the spark plug being screwed into a threaded aperture 20. The spark plug is arranged to extend through the communicating passage 17, the object being to cause the fresh cool charge to pass over the body of the spark plug, thereby reducing the temperature of the spark plug.

An annular opening 21 is formed in the wall of the valve cylinder, at a point crankward of the annular opening 16, an opening 22 of this annular opening is formed through the cylinder block, a connection may be made between the source of fresh charge supply and the said opening.

There are two annular recesses formed in the periphery of the inlet valve 13, one a recess 23 is formed at a point most crankwardly of the valve, this annular recess is adapted to register passage communication between the two annular openings 16 and 21 formed in the valve cylinder, the full periphery of the valve being designed to cut off the said passage communication between the said openings.

The second annular recess 24 is formed in the periphery of the valve. This annular recess is adapted to provide a passage communication between the fresh charge transfer ports 15 and the combustion chamber, and the cut off of the passage communication being accomplished by the full periphery of the valve.

A bore 25 is machined to form a cylindrical center of the valve and a depending plug 26 is arranged to be fitted closely within the bore of the valve, the depending plug is constructed hollow to accommodate a cooling fluid being circulated through the cell 27 of the plug.

The head end of the cooling plug is formed as a flange head to the valve cylinder, with an aligning shoulder 28 formed as a step in the crank end side of the flange top of the plug. The cooling fluid cell of the plug extends laterally through the flange head part and communicates with the cooling fluid cell formed around the valve cylinder.

The valve is constructed with a land between the head end and the most headwardly located annular recess of the two annular recesses formed in the periphery of the valve. This provides a bearing surface for the valve, also a land of full valve diameter in which expansion rings may be accommodated. A land is formed between the two annular recesses of the valve periphery, as a central valve bearing surface and as a second point to which expansion rings may be located in the periphery of the valve. By this construction and location of expansion rings on the valve it will be seen that the annular recess which communicates with the combustion chamber is provided with internal pressure sealing means.

Exhaust ports 29 are formed through the wall of the combustion cylinder 11. A power piston 30 is arranged for reciprocatory movement within the combustion cylinder 11 and the said exhaust ports are arranged in a position relative to the stroke of the said power piston which will permit the said exhaust ports being uncovered to the chamber of the combustion cylinder, only at the time the said power piston occupies the position of crank end dead center. A separate connection is made between the power piston and the valve by which the reciprocatory movement may be imparted to the said piston and valve member in whatever timing relation is desired.

During the time the power piston is moving crankwardly on the crankward stroke the valve is actuated in a headward direction. The piston and valve are preferably timed, relatively with respect to the relative time of their stroke movement, which will permit the exhaust ports to be opened first.

At the time the second annular recess 23 of the valve is moved in a headwardly direction cut off of the passage communication between the two annular openings 16 and 21 is provided and the possibility of a back flow of the fresh charge to the source of supply is eliminated. When the valve is actuated in a crankwardly direction the annular recess 23 of the valve periphery will engage the two annular openings 16 and 21, establishing passage communication between the source of fresh charge supply port 22 and the charge pumping means, which may be attached to the opening 18 of the passage 17.

The combined cooling influence of the fresh charge sweeping the recessed periphery of the valve and of the cooling fluid plug being fitted within the bore of the valve will assure ample cooling of the valve for sustained heavy duty supercharged operation of the engine in two stroke cycle order.

It will be understood that minor changes in the size, form and construction of the various parts of my improved engine may be made and substituted for those herein described without departing from the spirit of the invention, the scope of which is set forth in the appended claims.

I claim as my invention:

1. An internal combustion engine provided with a combustion chamber and with a fresh charge inlet valve cylinder chamber, an inlet valve arranged for reciprocatory movement within the valve cylinder chamber, the periphery of the valve being cylindrical in form, two annular grooves formed in the said cylindrical periphery of the valve, one of the said two annular grooves providing fresh charge inlet passage communication from the source of fresh charge supply, the other one of the said two annular grooves providing fresh charge transfer passage communication to the combustion chamber.

2. An internal combustion engine, provided with a combustion cylinder chamber and with a fresh charge inlet valve cylinder chamber, a fresh charge inlet valve arranged for reciprocatory movement within the valve cylinder chamber, the center of the valve being constructed cylindrical in form, a cylinder head attached to the valve cylinder, a depending extension of the valve cylinder head arranged for a sliding fit within the said inlet valve, a cooling fluid duct formed in the valve cylinder head, and the said cooling fluid duct extending through the depending extension of the valve cylinder head.

3. The combination with an internal combustion engine, of a combustion cylinder, a valve cylinder, a piston arranged for reciprocatory movement within the combustion cylinder, a valve arranged for reciprocatory movement within the valve cylinder, a passage joining the chamber of the combustion cylinder with the chamber of the valve cylinder, exhaust ports formed in the wall of the combustion cylinder, inlet ports formed in the wall of the valve cylinder, the said inlet ports of the valve cylinder being formed in three planes, the axes of each of the three planes being at right angles to the axis of the valve cylinder, the inlet ports occupying one plane being adapted to fresh charge valvular function to the combustion chamber, the ports occupying the other two planes being arranged adjacent and adapted to the vavular function of fresh charge admission from the source of fresh charge supply, two annular grooves formed in the periphery of the said valve, one of the said annular grooves being adapted to passage registeration and cut off with the inlet ports occupying one plane and adapted to the function of fresh charge admission to the combustion chamber, the other of the two annular grooves formed in the periphery of the valve being adapted to passage registration and cut off with the inlet ports occupying the other two planes and adapted to the function of fresh charge inlet from the source of fresh charge supply.

4. The combination with an internal combustion engine having the usual combustion chamber and piston, of a valve cylinder and an inlet valve arranged for reciprocatory movement within the valve cylinder, of a valve cylinder head depending from the valve cylinder, the said valve cylinder head extending crankwardly and arranged as a stationary abutment, of sliding fit within the bore of the valve, of a cooling fluid cell formed within the said cylinder head and extending abutment, of a fluid circulation passage joining the said cooling fluid cell of the said stationary abutment with the main cooling fluid cells of the engine.

In testimony whereof, I hereto affix my signature.

EVERETT R. BURTNETT.